Figure 1:
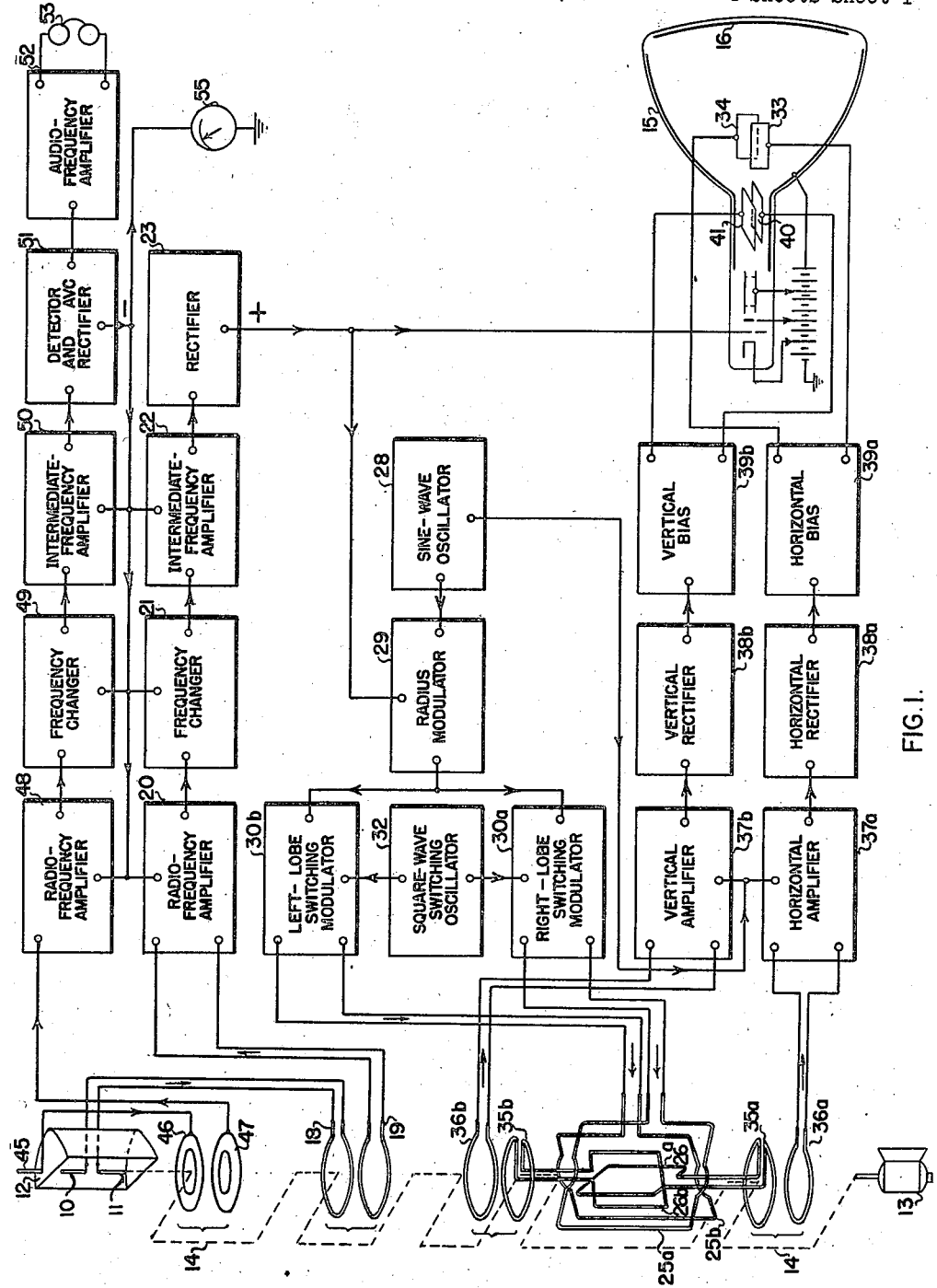

INVENTOR
JOHN KELLY JOHNSON.
HAROLD A. WHEELER.
BY Harry C. Page
ATTORNEY

Sept. 10, 1946. J. K. JOHNSON ET AL 2,407,281
RADIATED-SIGNAL DIRECTION FINDER
Filed Dec. 18, 1941 4 Sheets-Sheet 2

INVENTOR
JOHN KELLY JOHNSON.
HAROLD A. WHEELER.
BY Harry C. Page
ATTORNEY

Patented Sept. 10, 1946

2,407,281

UNITED STATES PATENT OFFICE 2,407,281

RADIATED-SIGNAL DIRECTION FINDER

John Kelly Johnson, Deerfield, Ill., and Harold A. Wheeler, Great Neck, N. Y., assignors, by mesne assignments, to Hazeltine Research, Inc., Chicago, Ill., a corporation of Illinois Application December 18, 1941, Serial No. 423,514

13 Claims. (Cl. 250—11)

1

This invention relates generally to radiated-signal direction finders and, particularly, to radiated-signal direction finders of a type in which lines sharply indicative of the direction of reception of a signal are traced by a line-tracing device.

It is frequently desirable to provide a radiated-signal direction finder in which manipulation is unnecessary while determining the direction of reception of a received signal. It may be that conditions of reception are such that insufficient time is available to make such manipulations. For example, the carrier signals being received from a radio transmitter, the direction of which is to be determined, are usually amplitude-modulated so that an accurate indication of the direction of the transmitter is difficult to obtain except during short periods when the carrier wave of such a transmitter is not modulated. It may be impossible for the operator of a direction finder to make the necessary manipulations during one of these short periods in order accurately to determine the direction of the transmitter. It is, therefore, highly desirable to provide a direction finder which is fast acting and which requires no manipulation by the operator during the time interval in which the direction of reception of a received signal is actually being determined. It has been proposed to provide, in a direction finder, an arrangement by which lines indicative of the direction of reception of a received signal are traced by a line-tracing device. For example, it has been proposed to trace overlapping directive patterns of an antenna system by line-tracing devices in such manner that a crossover point of the directive patterns provides an indication of the direction of reception of a signal being received by the antenna. However, such prior art arrangements have been more complicated than is desired. For example, some of such prior art devices actually comprise two complete line-tracing arrangements each effective to trace one of the overlapping directive patterns. Other similar prior art devices provide a single line-tracing device together with a suitable optical system for providing overlapping patterns rendering such systems more complicated than is desired.

It is, therefore, an object of the invention to provide an improved radiated-signal direction finder of the type under consideration which is not subject to one or more of the above-mentioned disadvantages of prior art arrangements.

It is another object of the invention to provide an improved radiated-signal direction finder

2 of the type in which lines indicative of the direction of reception of a received signal are traced by a line-tracing device in such a manner as to form a pattern with intersections particularly suitable for indicating the direction of reception of a received carrier signal.

In accordance with the invention, a radiated-signal direction finder comprises a receiving pick-up system having a directive pattern, means for rotating the directive pattern of the pick-up system, a line-tracing device, means for controlling the line-tracing device to trace a line in synchronism with the rotation of said directive pattern, and means responsive to the amplitude of a signal received by the pick-up system for shifting the line traced by the line-tracing device in accordance with the directive pattern. The radiated-signal direction finder also comprises means for supplying a periodic control signal having a frequency which is high with reference to the frequency at which the reference pattern is rotated. It further includes means responsive to the control signal for cyclically laterally displacing the line traced by the line-tracing device at the frequency of the control signal, to trace intersecting lines the intersections of which are sharply indicative of the direction of reception of the received signal.

For a better understanding of the present invention, together with other and further objects thereof, reference is had to the following description taken in connection with the accompanying drawings, and its scope will be pointed out in the appended claims.

Figure 5B:
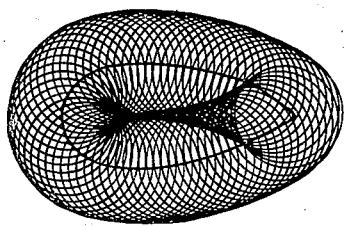
Figure 5D:
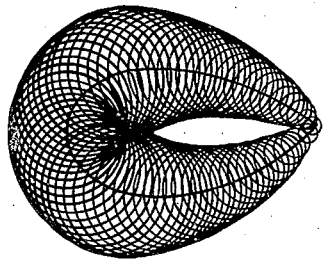
Figure 5A:
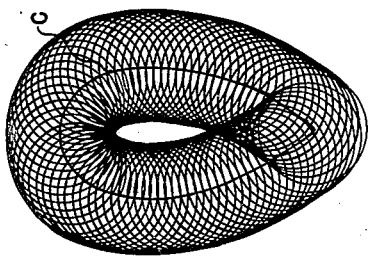
Figure 5C:
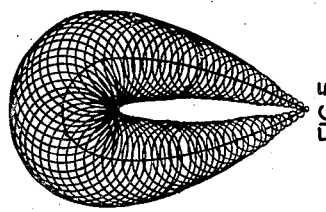
Figure 4:
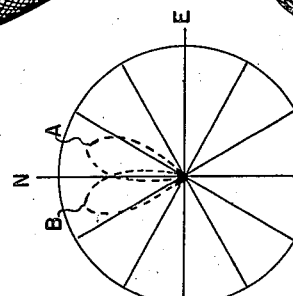
Figure 3A:
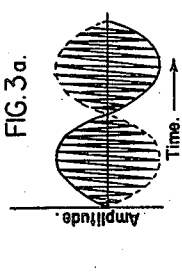
Figure 3B:
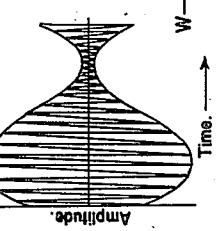
Figure 3C:
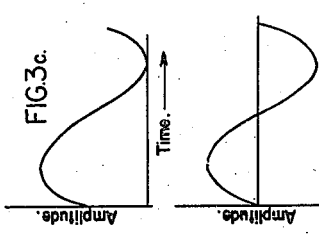
Figure 3D:
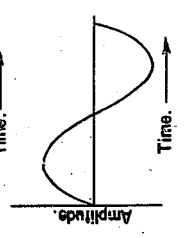
Figure 6:
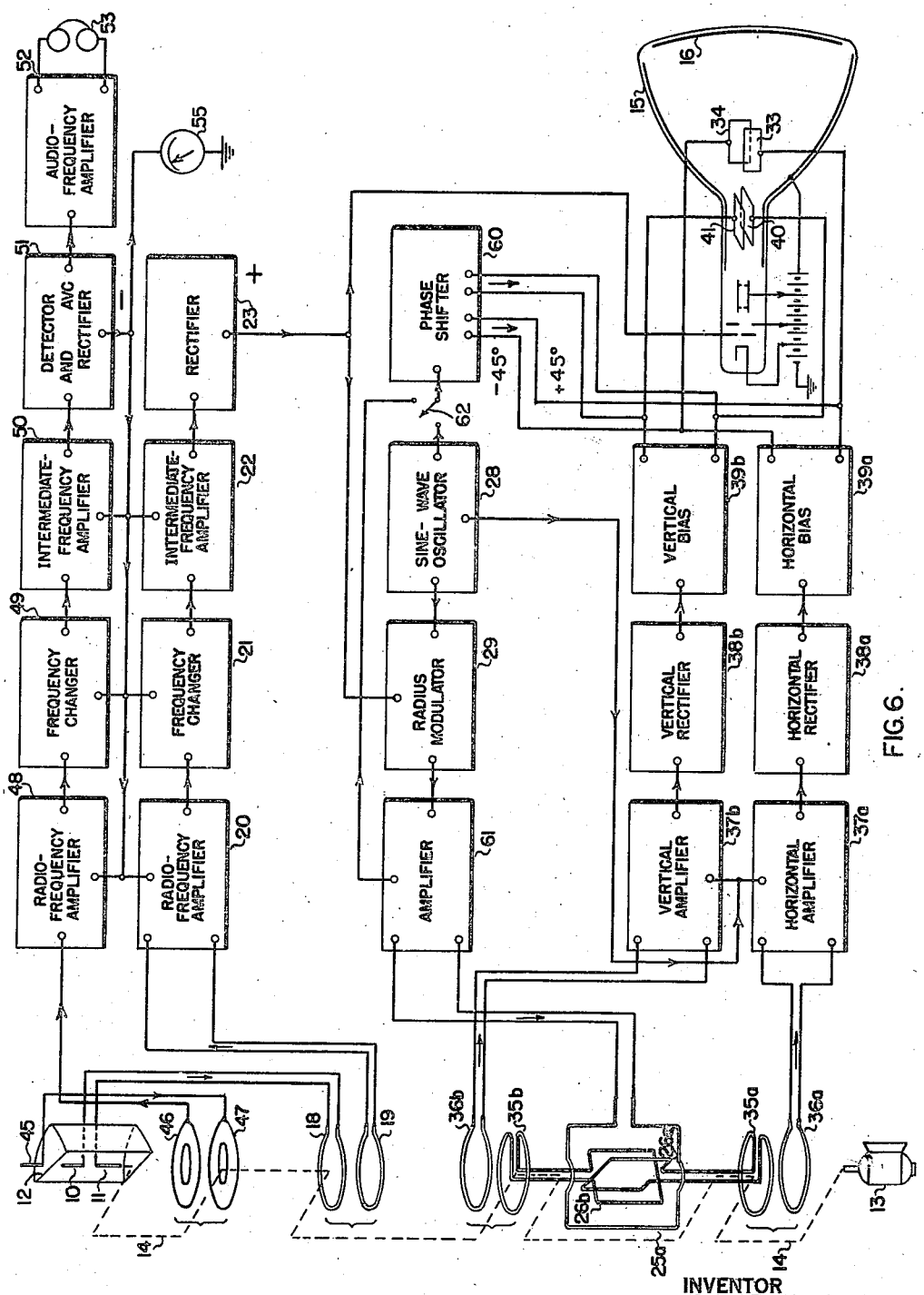
Figure 7:
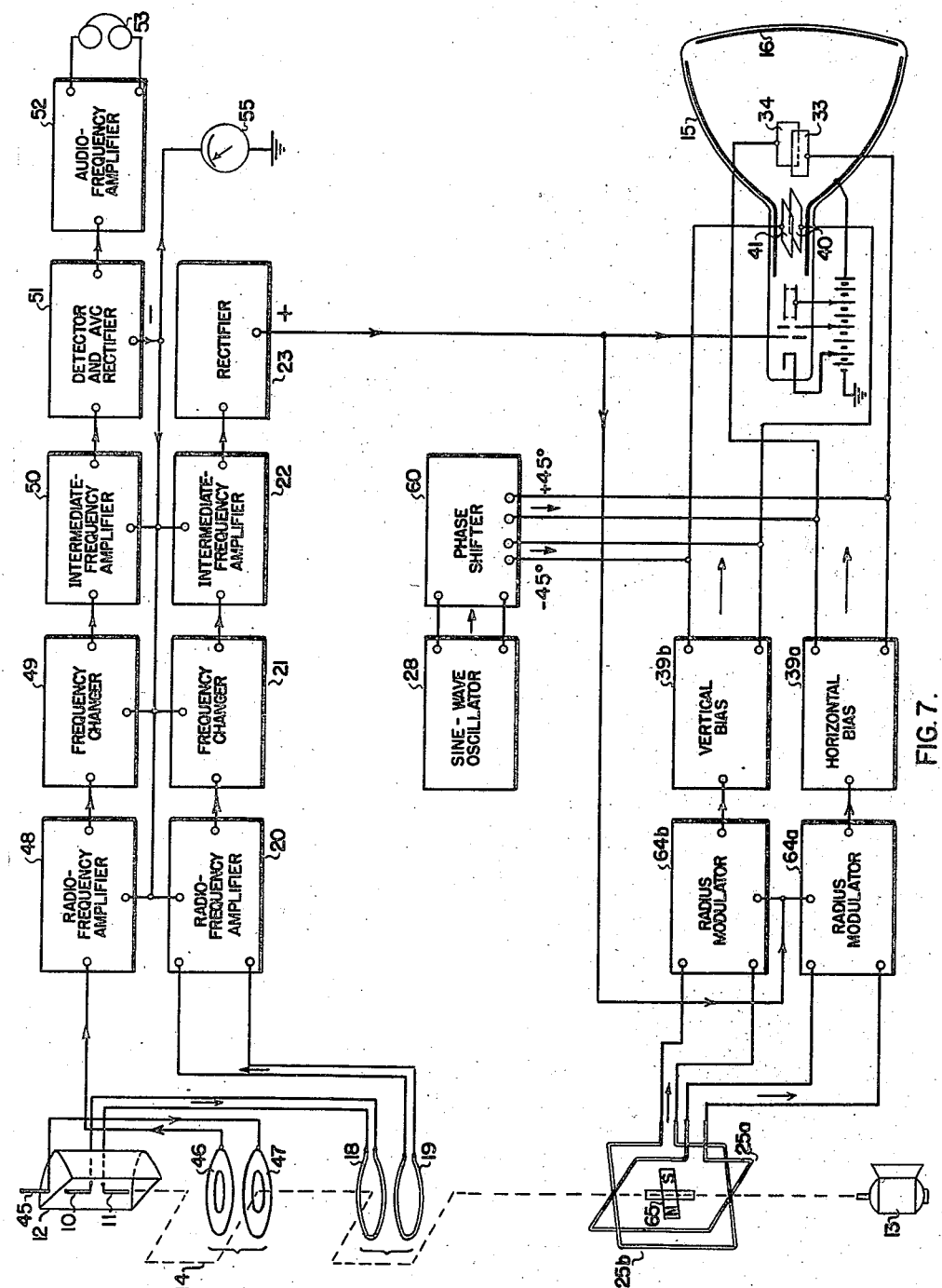

Referring to the drawings, Figs. 1, 6 and 7 are schematic circuit diagrams of different embodiments of radiated-signal direction finders in accordance with the invention; Figs. 2a to 2d, inclusive, and Figs. 3a to 3d, inclusive, are graphs utilized to explain the operation of the direction finder of Fig. 1; Fig. 4 illustrates the pattern produced on the screen of the cathode-ray tube of the direction finder of Fig. 1, while Figs. 5a to 5d, inclusive, illustrate different patterns which may be obtained by different embodiments of the direction finder of Fig. 6.

Referring now more particularly to Fig. 1 of the drawings, the radiated-signal direction finder there illustrated comprises a receiving pick-up system such as an antenna system having a directive pattern. Such receiving antennna system is provided by the dipole antenna 10, 11 and the reflector 12. The direction finder also comprises means for rotating the directive pattern of the antenna system 10, 11. This means comprises a motor 13 mechanically coupled, as indicated by the broken line 14, to the antenna system 10, 11 and its associated reflector 12. The signal output of the antenna system 10, 11 is coupled to a receiving system through a pair of inductively-coupled loops 18 and 19, loop 19 being stationary and loop 18 being driven, as indicated by the broken line 14, with the antenna system 10, 11 and its associated reflector 12. The receiver coupled to antenna system 10, 11 comprises, in cascade, a radio-frequency amplifier 20 of one or more stages, a frequency changer or oscillator-modulator 21, an intermediate-frequency amplifier 22 of one or more stages, and a rectifier 23.

There is also comprised in the arrangement of Fig. 1 a line-tracing device which includes a cathode-ray tube 15 and means for causing the beam of the tube to traverse a circle on the fluorescent screen 16 on the end of the cathode-ray tube.

The arrangement also comprises means for controlling the line-tracing device or the rotation of the beam of the cathode-ray tube 15 to trace a line in synchronism with the rotation of the directive pattern of the antenna system 10, 11. The means for rotating the beam of the cathode-ray tube 15 and for synchronizing the scanning spot thereof with the antenna rotation comprises a system for indicating relative mechanical motion between two members adapted to have relative motion therebetween and forms the subject matter of application Serial No. 423,515, filed concurrently with the instant application in the name of John Kelly Johnson. These members may be considered to be, for example, the stator and the rotor of the motor 13. Impedance-coupling means are provided in the motion-indicating system having relatively movable primary and secondary elements, the relative positions of which determine the electrical coupling therebetween. Such impedance-coupling means, in the embodiment illustrated, comprise primary elements 25a and 25b and secondary elements 26a and 26b. The relative position of the primary and secondary elements, respectively, determines the electrical coupling therebetween. The primary elements 25a and 25b are stationary and are angularly spaced by a relatively small amount, while the secondary elements 26a and 26b are angularly spaced at right angles to each other and are adapted to be rotated by the motor 13, as indicated by the broken line 14.

A sine-wave oscillator 28 is provided for supplying to the primary elements 25a and 25b oscillations of a period much less than the effective minimum period of the motion between the respective primary and secondary elements. Sine-wave oscillator 28 is connected, through a radius modulator 29 and a right-lobe switching modulator 30a, to the primary element 25a and is connected, through the radius modulator 29 and a left-lobe switching modulator 30b, to the primary element 25b. In order to cause either the right-lobe switching modulator 30a or the left-lobe switching modulator 30b to be effective, there is provided a square-wave switching oscillator 32, comprising means for supplying a periodic control signal. This oscillator has output circuits coupled, respectively, to units 30a and 30b and is adapted to cause these units to be alternately operative at the frequency of the control signal, specifically a frequency which is high with respect to the frequency at which the antenna system 10, 11 is rotated. Secondary element 26a is connected to horizontal deflecting plates 33, 34 of cathode-ray tube 15 by means of a coupling system comprising inductively-coupled loops 35a, 36a, a horizontal amplifier 37a, a horizontal rectifier 38a and a horizontal bias 39a. The loop 35a is connected directly to the terminals of the secondary elements 26a and is adapted to be rotated by motor 13 as indicated by the broken line 14, the loop 36a being stationary.

Similarly, the vertical deflecting plates 40, 41 of cathode-ray tube 15 are connected to loop 26b through a system comprising a rotating loop 35b, a stationary loop 36b, a vertical amplifier 37b, a vertical rectifier 38b and a vertical bias 39b.

The signal output of rectifier 23 is applied to the radius modulator 29 and, in order to effect synchronous detection in rectifiers 38a and 38b, sine-wave oscillations developed in oscillator 28 are also applied to the rectifiers 38a and 38b through the horizontal amplifier 37a and the vertical amplifier 37b, respectively. The amplitude of the oscillations supplied to units 37a and 37b from oscillator 28 is greater than that supplied to these units from elements 36a and 36b and of substantially the same phase. This phase relationship is not very critical but must be within 90 degrees and is preferably within about 20 degrees. The signal output of rectifier 23 is also applied to the control grid of the cathode-ray tube 15 and suitable operating potentials are provided therefor in a manner which is, per se, well understood in the art.

Inasmuch as the directive antenna system 10, 11 has a directive radiation pattern the orientation of which varies relative to the direction of reception of a desired signal, the amplitude of the signal utilized in units 20 to 23, inclusive, varies in accordance with this relative orientation and in accordance with the amplitude of the radiated signal being received. In order to eliminate such amplitude variations in accordance with the amplitude of the radiated signal, a control system is provided for the receiver comprising units 20 to 23, inclusive. This control system, which forms the subject matter of copending application Serial No. 423,516, filed in the name of Harold A. Wheeler concurrently with the filing of the present application, comprises a second antenna system 45 having a radiation pattern which is less directive than that of the first antenna system 10, 11 and preferably non-directive, means coupled with the second antenna system 45 for deriving, in response to the desired signal received thereby, a control effect which varies primarily in accordance with the amplitude of the radiated signal being received, and means for utilizing the derived control effect to adjust an operating characteristic of the receiver comprising units 20 to 23, inclusive. As illustrated in the drawings, the antenna 45 comprises a vertical conductor mounted on the reflector 12, adapted to be rotated therewith, and capacitively coupled through a rotating plate 46 and a stationary plate 47 to the input circuit of a receiver. This last-named receiver comprises, in cascade, a radio-frequency amplifier 48 of one or more stages, a frequency changer or oscillator-modulator 49, an intermediate-frequency amplifier 50 of one or more stages, a detector and A. V. C. rectifier 51, an audio-frequency amplifier 52 of one or more stages, and a sound-signal reproducing device 53. A voltage from the A. V. C. rectifier in unit 51 is applied to one or more of the tubes of stages 48, 49 and 50 to maintain the amplitude of the signal input to detector 51 within a relatively narrow range for a wide range of received signal amplitudes, and, additionally, the A. V. C. rectifier in unit 51 is utilized to control the gain of stages 20, 21 and 22 to maintain the amplitude of the signal input to rectifier 23 within a relatively narrow range for a wide amplitude range of the radiated signal being received. A suitable tuning meter is preferably provided for the two receivers 20 to 23, inclusive, and 48 to 53, inclusive, which may comprise a high-resistance voltmeter 55 coupled across the A. V. C. source of unit 51.

Figure 2A:
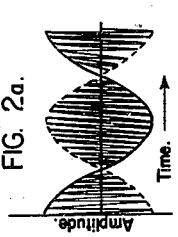
Figure 2B:
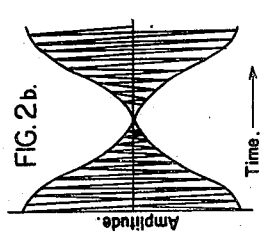
Figure 2C:
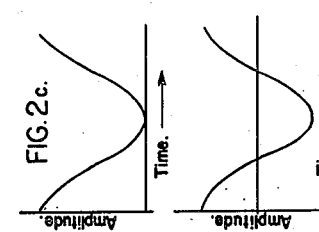
Figure 2D:
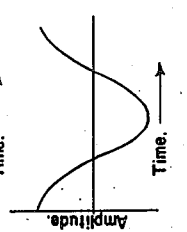

Referring now to the operation of the direction finder of Fig. 1, it will be seen that the arrangement comprises the directive antenna system 10, 11 having a directive pattern, and that the motor 13 is adapted to rotate the antenna system 10, 11 to rotate the directive pattern. The line-tracing device 15, in the absence of a received signal, is effective to trace a circular path on the fluorescent screen 16. In order to explain the manner in which this is done it will first be assumed that the right-lobe switching modulator 30a is in an operative condition and that the square-wave switching oscillator 32 is disconnected therefrom. Under these conditions oscillations from oscillator 28 are applied, through radius modulator 29 which, in the absence of a received signal as assumed, functions as an amplifier and the right-lobe switching modulator 30a to the primary element 25a, the relative position of which with respect to the secondary element 26a determines the electrical coupling between these primary and secondary elements. There are thus applied to the secondary element 26a oscillations the amplitude of which is modulated in accordance with the relative motion between elements 25a and 26a. The oscillations so induced in element 26a are represented by the curves of Fig. 2a and correspond to the oscillations produced by sine-wave oscillator 28 modulated in amplitude and polarity in accordance with the relative motion between members 25a and 26a. The oscillations represented by the curves of Fig. 2a may be recognized as a modulated signal the modulation components of which can only be derived by a synchronous detection process by which the correct percentage of modulation is restored to the signal. These oscillations are coupled to the rectifier 38a through the elements 35a, 36a and 37a. To restore the correct percentage of modulation to these oscillations, the sine waves developed by oscillator 28 are applied to the rectifier 38a through the horizontal amplifier 37a and are effective to transform the oscillations of Fig. 2a into a signal which is modulated in amplitude only by an amount equal to or less than 100%, as indicated by the curves of Fig. 2b of the drawings. The horizontal rectifier 38a derives the modulation component of this signal which varies in accordance with the relative motion between the two members 25a and 26a, this component being illustrated by the curve of Fig. 2c of the drawings. The signal output of horizontal rectifier 38a is converted to a signal with zero average value, as illustrated by the curve of Fig. 2d of the drawings, by superposition of a horizontal bias potential in unit 39a and is applied to the horizontal deflecting plates 33, 34. The voltage applied to deflecting plates 33, 34, assuming a uniform speed of rotation of motor 13, is therefore a sine wave having a period equal to the period of rotation of motor 13.

Inasmuch as the vertical deflecting system is substantially the same as the horizontal deflecting system, a similar voltage is applied to deflecting plates 40, 41, which voltage, however, is displaced in phase by 90 degrees from the voltage applied to deflecting plates 33, 34 due to the 90-degree physical displacement between the elements 26a and 26b. The curves of Figs. 3a to 3d are generally similar, therefore, to the curves of Figs. 2a to 2d, respectively, and represent corresponding potentials of the vertical deflecting system. The arrangement just described, therefore, serves to cause the beam of the cathode-ray tube 15 to trace a circular path on the fluorescent screen 16 of tube 15.

Before considering the effect of the square-wave switching oscillator 32 upon the arrangement just described, the effect of the signal applied from rectifier 23 to the radius modulator 29 will be considered. The amplitude of this signal varies in accordance with the directive-radiation pattern of antenna system 10, 11 and is maximum when the open face of the reflector 12 faces the transmitter being received. The signal from rectifier 23 is applied to the modulator 29 so that the radius of the circle traced by the beam of tube 15 decreases with decreasing amplitude of the received signal. In this way the arrangement is effective to trace upon the fluorescent screen 16 a pattern representing the directive radiation pattern of antenna system 10, 11. One such pattern is represented by the dotted line A of Fig. 4, the solid-line circle representing the end of the cathode-ray tube 15. Compass points, as indicated, may be provided on the end of the cathode-ray tube 15. It will be understood, however, that in the arrangement just described the line traced by cathode-ray tube 15 is a continuous line and is not dotted, as shown.

If now it is assumed that the right-lobe switching modulator 30a is inactive, the left-lobe switching modulator 30b is active, and the square-wave switching oscillator 32 is disconnected from the switching modulator 30b, it will be seen that the only change in the system just described is effectively a physical rotation of the primary element which induces oscillations into the secondary elements 26a and 26b. In the case under present consideration, the primary element 25b is the effective member. Under the conditions just assumed, therefore, the line-tracing device 15 of Fig. 1 is effective to trace a directive pattern displaced from the one previously described and may, for example, trace a directive pattern similar to curve B of Fig. 4. Preferably, the angular relationships between the elements 25a, 25b, 26a, and 26b, on the one hand, and the reflector 12 on the other, are so proportioned that the point of overlap of the directive patterns A and B represents the true direction of the transmitter being received.

If now the effect of square-wave switching oscillator 32 upon the circuit of Fig. 1 is considered, it will be seen that the primary elements 25a and 25b are alternately effective in the system, these elements being switched at a high frequency by the switching oscillator 32. In place of tracing continuous lines upon the cathode-ray tube as described, when the square-wave switching oscillator 32 is utilized, a portion of one pattern is first traced, a portion of the next pattern is then traced, etc., and the patterns which are visible on the fluorescent screen 16 are of dotted form, as illustrated in Fig. 4. The effect of the signal derived from rectifier 23 and applied to the control grid of cathode-ray tube 15 is to cause the outer portions of the directive loops traced on screen 16 to be as bright as the inner portions of the loops even though the spot is moving more rapidly.

In the arrangement just described, a slow variation of the amplitude of the radiated signal which is intercepted by antennas 10 and 11 would be also effective to shift the pattern traced by line-tracing device 15 and the operation of the arrangement will be as described only when there is no such variation of the amplitude of the radiated signal which is being intercepted. It is for the purpose of compensating for such slow variations of amplitude that the automatic amplification control system for units 20, 21 and 22 is provided. The receiver comprising units 48 to 53, inclusive, operates in a conventional manner and it will be understood that this receiver, as well as the receiver comprising units 20 to 23, inclusive, is adapted to be tuned to the desired signal with the aid of tuning meter 55. The automatic amplification control effect, which is effective to vary the gain of one or more of stages 20, 21 and 22, is effective at least partially to compensate for slow amplitude variations of the radiated signal which is intercepted by the antenna system 10, 11.

In summary, therefore, it is seen that the radiated-signal direction finder of Fig. 1 comprises a receiving pick-up system including the antenna 10, 11 which has a directive pattern and that means comprising motor 13 are provided for rotating the directive pattern of the pick-up system. A line-tracing device comprising tube 15 is provided, together with means including the element 25a for synchronizing the line-tracing device with the rotation of the directive pattern of the antenna system 10, 11. The system additionally includes means comprising the rectifier 23 responsive to the amplitude of a signal received by the pick-up system 10, 11 for shifting the line traced on screen 16 in accordance with the directive pattern of the antenna system 10, 11, as well as means including the square-wave switching oscillator 32 for cyclically laterally displacing the line traced at a frequency which is high with respect to the frequency at which the directive pattern of the antenna system 10, 11 is rotated to trace intersecting lines, the intersections of which are sharply indicative of the direction of reception of the received signal. It will further be seen that the cathode-ray line-tracing device is normally effective to trace a circular path with the cathode-ray beam of the tube, and that the radius modulator 29 comprises means responsive to the amplitude of the signal received by the pick-up system 10, 11 for modulating the radius of the circular path in accordance with the directive pattern of the pick-up system 10, 11, and that the switching oscillator 32 is included in a means for cyclically displacing the line traced by cathode-ray tube 15 to form directive patterns as illustrated in Fig. 4 in which intersecting lines provide a sharp indication of the direction of reception of the received signal. Furthermore, it will be seen that the two primary elements 25a and 25b, together with square-wave switching oscillator 32, comprise means for cyclically angularly displacing the radius of the circular path traced by the cathode-ray beam.

The arrangement of Fig. 6 is generally similar to the arrangement of Fig. 1 and similar circuit elements in the two figures have identical reference numerals. The arrangement of Fig. 6 differs from the arrangement of Fig. 1 primarily in that square-wave switching oscillator 32 and its associated elements have been omitted and in that a different arrangement comprising a phase shifter 60 and associated connections has been added in order to provide a pattern on screen 16 which has intersecting lines suitable for indicating the direction of reception of a received signal. The circuit of Fig. 6 thus comprises only a single primary coupling element 25a which is coupled to sine-wave oscillator 28 through radius modulator 29 and an amplifier 61. Phase shifter 60 is adapted, by means of a two-position switch 62, to be coupled directly to sine-wave oscillator 28 or to this oscillator through the radius modulator 29 and the amplifier 61. The phase shifter 60 is so designed as to supply to the respective sets of deflecting plates of cathode-ray tube 15 two sine-wave voltages which are 90 degrees apart, these voltages being superposed on the deflecting voltages supplied through units 39a and 39b, respectively.

In considering the operation of the circuit of Fig. 6, and neglecting for the moment the operation of phase shifter 60, it will be seen that the arrangement is effective to plot the directive pattern of the antenna system 10, 11 upon the screen 16 of the cathode-ray tube in a manner similar to that described above. In other words, this plot may be of the form indicated by the line C of Fig. 5a. If switch 62 is now assumed to be in such a position as to couple the phase shifter 60 directly to the sine-wave oscillator 28, there is superposed on the deflection potentials applied to the pairs of deflecting plates of cathode-ray tube 15 two sine-wave voltages which are effective additionally to impart to the indicating spot of the cathode-ray tube 15 a circular motion at the frequency of oscillator 28, which frequency is high with respect to the frequency at which the antenna system is rotated. The pattern traced by the spot under the condition assumed may take the form illustrated in Fig. 5a, and it is thus seen that the intersecting lines in the upper middle region of this pattern are sharply indicative of the direction of reception of the radiated signal intercepted by antenna system 10, 11.

In one preferred embodiment of the arrangement of Fig. 6, the curvature of the circular motion imparted through phase shifter 60 is substantially equal to the minimum curvature at the peak of the directive pattern of the antenna system 10, 11 upon the screen 16, and this is the condition which is represented by the pattern of Fig. 5a. In other words, the circular motion which is imparted to the scanning spot of tube 15 through the phase shifter 60 is of curvature substantially equal to the minimum effective curvature of the directive pattern indicated by the curve C.

In another preferred embodiment of the invention, the curvature of the circular motion so imparted is greater than the minimum curvature at the peak of the directive pattern on the screen 16 and, under such conditions, the arrangement of Fig. 6 may be effective to trace a pattern on the screen 16 as represented by Fig. 5b.

If the switch 62 is now operated so that phase shifter 60 is connected to the oscillator 28 through the radius modulator 29 and the amplifier 61, it will be seen that the radius of the circular motion imparted to othe scanning spot by phase shifter 60 is varied in accordance with the amplitude of the bias voltage provided from rectifier 23. Under these conditions the pattern of Fig. 5a is changed to that of Fig. 5c or the pattern of Fig. 5b is changed to that of Fig. 5d.

In Fig. 7 of the drawings there is illustrated a modification of the arrangement of Fig. 1 which is suitable for use in direction-finder systems rotating rapidly at a fixed speed. The arrangement of Fig. 7 is generally similar to the arrangements of Figs. 1 and 6 and similar circuit elements have identical reference numerals. The arrangement of Fig. 7 differs primarily from the arrangement of Fig. 1 in the portion of the system provided for causing the beam of line-tracing device 15 to trace a circular path in the absence of a received signal. In order to effect this operation in Fig. 7 the stationary members 25a and 25b of Fig. 1 have been directly connected, respectively, to the horizontal deflecting plates 33, 34 and to the vertical deflecting plates 40, 41, the element 25a being coupled to deflecting plates 33, 34 through a radius modulator 64a and horizontal bias 39a, and the element 25b being coupled to the vertical deflecting plates 40, 41 through a radius modulator 64b and vertical bias 39b. A magnet 65 is associated with elements 25a and 25b on the shaft driven by motor 13. In this case the elements 25a and 25b are physically displaced by 90 degrees.

In considering the operation of the arrangement of Fig. 7 it will be seen that, when the shaft with magnet 65 is driven by the motor 13, sine-wave voltages are induced in the elements 25a and 25b which are 90 degrees displaced and, neglecting the effect of radius modulators 64a and 64b, cause suitable voltages to be applied to the deflecting plates of tube 15 to cause the beam of the tube to trace a circular path on the screen 16. If the effect of the radius modulators 64a and 64b is considered, it will be seen that the amplitudes of the deflecting voltages applied to tube 15 are varied in accordance with the amplitude of the signal derived from rectifier 23, and that the arrangement of Fig. 7 is thus effective to trace the directive pattern of the antenna system 10, 11 on the screen 16. The sine-wave oscillator 28 and phase shifter 60 serve to impart a circular motion to the indicating spot of the cathode-ray tube 15 of frequency which is high with respect to the frequency at which the antenna system 10, 11 is rotated in order to trace a pattern of one of the types indicated in Fig. 5a or Fig. 5b.

While the invention has been described with reference to a radio direction finder, it will be evident that the principles of the invention are equally applicable to light-signal or sound-signal or supersonic-signal direction finders, operating in air or water, and it will be understood that the term "pick-up system," as used in this specification, is intended also to include pick-up arrangements for receiving light or sound waves.

While applicant does not intend to be limited to any particular constants for the embodiments of the invention described, there follows a partial list of constants which have been found to be particularly suitable in the embodiment of the invention illustrated in Fig. 1:

Frequency of rotation of reflector 12
    cycles per second__ 1 to 2
Frequency of switching oscillator 32
    kilocycles__ 1
Frequency of sine-wave oscillator 28
    kilocycles__ 250
Intermediate frequency produced by frequency changer 21_____megacycles__ 8.25
Frequency of radiated signals being
    received _____megacycles__ 100 to 156

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A radiated-signal direction finder, comprising, a receiving pick-up system having a directive pattern, means for rotating said directive pattern of said pick-up system, a line-tracing device, means for controlling said line-tracing device to trace a line in synchronism with the rotation of said directive pattern, means responsive to the amplitude of a signal received by said pick-up system for shifting the line traced by said device in accordance with said directive pattern, means for supplying a periodic control signal having a frequency which is high with reference to the frequency at which said directive pattern is rotated, and means responsive to said control signal for cyclically laterally displacing the line traced by said device at the frequency of said control signal to trace intersecting lines the intersections of which are sharply indicative of the direction of reception of said signal.

2. A radiated-signal direction finder comprising, a receiving pick-up system having a directive pattern, means for rotating said directive pattern of said pick-up system, a line-tracing device for tracing a circular path, means for controlling said line-tracing device to trace a circular line in synchronism with the rotation of said directive pattern, means responsive to the amplitude of a signal received by said pick-up system for shifting the line traced by said device in accordance with said directive pattern, means for supplying a periodic control signal having a frequency which is high with reference to the frequency at which said directive pattern is rotated, and means responsive to said control signal for cyclically laterally displacing the line traced by said device at the frequency of said control signal to trace intersecting lines the intersections of which are sharply indicative of the direction of reception of said signal.

3. A radiated-signal direction finder comprising, a receiving pick-up system having a directive pattern, means for rotating said directive pattern of said pick-up system, a cathode-ray line-tracing device, means for controlling said line-tracing device to trace a line in synchronism with the rotation of said directive pattern, means responsive to the amplitude of a signal received by said pick-up system for shifting the line traced by said device in accordance with said directive pattern, means for supplying a periodic control signal having a frequency which is high with reference to the frequency at which said directive pattern is rotated, and means responsive to said control signal for cyclically laterally displacing the line traced by said device at the frequency of said control signal to trace intersecting lines the intersections of which are sharply indicative of the direction of reception of said signal.

4. A radiated-signal direction finder comprising, a receiving pick-up system having a directive pattern, means for rotating said directive pattern of said pick-up system, a cathode-ray line-tracing device for tracing a circular path with the cathode-ray beam of the tube, means for controlling said line-tracing device to trace a circular path in synchronism with the rotation of said directive pattern, means responsive to the amplitude of a signal received by said pick-up system for modulating the radius of said circular path in accordance with said directive pattern, means for supplying a periodic control signal having a frequency which is high with reference to the frequency at which said directive pattern is rotated, and means responsive to said control signal for cyclically laterally displacing the line traced by said device at the frequency of said control signal to form directive patterns in which the intersections of intersecting lines provide a sharp indication of the direction of reception of said signal.

5. A radiated-signal direction finder comprising, a receiving pick-up system having a directive pattern, means for rotating said directive pattern of said pick-up system, a line-tracing device, means for controlling said line-tracing device to trace a line in synchronism with the rotation of said directive pattern, means responsive to the amplitude of a signal received by said pick-up system for shifting the line traced by said device in accordance with said directive pattern, a source of oscillations having a frequency which is high with respect to the frequency at which said directive pattern is rotated, and means for utilizing said oscillations cyclically laterally to displace at the frequency of said oscillations the line traced by said device to trace intersecting lines the intersections of which are sharply indicative of the direction of reception of said signal.

6. A radiated-signal direction finder comprising, a receiving pick-up system having a directive pattern, means for rotating said directive pattern of said pick-up system, a line-tracing device for tracing a circular path, means for controlling said line-tracing device to trace a circular path in synchronism with the rotation of said directive pattern, means responsive to the amplitude of a signal received by said pick-up system for modulating the radius of said circular path in accordance with said directive pattern, means for supplying a periodic control signal having a frequency which is high with reference to the frequency at which said directive pattern is rotated, and means responsive to said control signal for cyclically angularly displacing the radius of said circular path at the frequency of said control signal to form intersecting directive patterns the intersections of which provide a sharp indication of the direction of reception of said signal.

7. A radiated-signal direction finder comprising, a receiving pick-up system having a directive pattern, means for rotating said directive pattern of said pick-up system, a device for tracing a line with an indicating spot, means for synchronizing said line-tracing device with the rotation of said directive pattern, means responsive to the amplitude of a signal received by said pick-up system for shifting the line traced by said device in accordance with said directive pattern, and means for additionally imparting to said indicating spot a circular motion of frequency which is high with respect to the frequency at which said directive pattern is rotated to trace a pattern having intersecting lines sharply indicative of the direction of reception of said signal.

8. A radiated-signal direction finder comprising, a receiving pick-up system having a directive pattern, means for rotating said directive pattern of said pick-up system, a device for tracing a line with an indicating spot, means for synchronizing said line-tracing device with the rotation of said directive pattern, means responsive to the amplitude of a signal received by said pick-up system for shifting the line traced by said device in accordance with said directive pattern, means for additionally imparting to said indicating spot a circular motion of frequency which is high with respect to the frequency at which said directive pattern is rotated to trace a pattern having intersecting lines sharply indicative of the direction of reception of said signal, and means for varying the radius of said circular motion in accordance with the amplitude of said signal received by said pick-up system.

9. A radiated-signal direction finder comprising, a receiving pick-up system having a directive pattern, means for rotating said directive pattern of said pick-up system, a line-tracing device for tracing a circular path with an indicating spot, means for synchronizing said line-tracing device with the rotation of said directive pattern, means responsive to the amplitude of a signal received by said pick-up system for modulating the radius of said circular path in accordance with said directive pattern to trace said directive pattern on said line-tracing device, and means for additionally imparting to said indicating spot a circular motion of curvature greater than the minimum curvature at the peak of said directive pattern on said line-tracing device and of frequency which is high with respect to the frequency at which said directive pattern is rotated to trace a pattern having intersecting lines sharply indicative of the direction of reception of said signal.

10. A radiated-signal direction finder comprising, a receiving pick-up system having a directive pattern, means for rotating said directive pattern of said pick-up system, a line-tracing device for tracing a circular path with an indicating spot, means responsive to the amplitude of a signal received by said pick-up system for modulating the radius of said circular path in accordance with said directive pattern to trace said directive pattern on said line-tracing device, and means for additionally imparting to said indicating spot a circular motion of curvature substantially equal to the minimum curvature at the peak of said directive pattern on said line-tracing device and of frequency which is high with respect to the frequency at which said directive pattern is rotated to trace a pattern having intersecting lines sharply indicative of the direction of reception of said signal.

11. A radiated-signal direction finder comprising, a receiving pick-up system having a directive pattern, means for rotating said directive pattern of said pick-up system, a cathode-ray tube including means adapted to develop two beam-deflecting fields normal to each other, means for energizing said last-named means to produce beam-deflecting fields having 90-degree relative phase displacement to trace a circular path with the beam of said tube in synchronism with the rotation of said directive pattern, means responsive to the intensity of a signal received by said pick-up system for varying in accordance therewith the energization of said beam-deflecting field means by said energizing means, means for supplying a periodic control signal having a frequency which is high with reference to the frequency at which said directive pattern is rotated, and means responsive to said control signal for cyclically laterally displacing the path traced by the beam of said tube at the frequency of said control signal to trace intersecting lines the intersections of which are sharply indicative of the direction of reception of said signal.

12. A radiated-signal direction finder comprising, a receiving pick-up system having a directive pattern, means for rotating said directive pattern of said pick-up system, a cathode-ray tube including means adapted to develop two beam-deflecting fields normal to each other, means for generating and applying to said last-named means two alternating potentials having 90-degree relative phase displacements and having frequencies synchronized with the rotation of the directive pattern of said pick-up system, whereby said tube traces a circular line in synchronism with the rotation of said pick-up system, means responsive to the intensity of a signal received by said pick-up system for controlling the amplitude of said alternating potentials in accordance therewith, means for supplying a periodic control signal having a frequency which is high with reference to the frequency at which said directive pattern is rotated, and means responsive to said control system for cyclically laterally displacing the line traced by said tube at the frequency of said control signal to trace intersecting lines the intersections of which are sharply indicative of the direction of reception of said signal.

13. A radiated-signal direction finder comprising, a receiving pick-up system having a directive pattern, means for rotating said directive pattern of said pick-up system, a cathode-ray tube including means adapted to develop two beam-deflecting fields normal to each other, means including a source of oscillations for generating and applying to said last-named means two alternating potentials having 90-degree relative phase displacements and having frequencies synchronized with the rotation of the directive pattern of said pick-up system, whereby said tube traces a circular line in synchronism with the rotation of said pick-up system, means responsive to the intensity of a signal received by said pick-up system for controlling the amplitude of said alternating potentials in accordance therewith, means for supplying a periodic control signal having a frequency which is high with reference to the frequency at which said directive pattern is rotated, and means responsive to said control system for cyclically laterally displacing the line traced by said tube at the frequency of said control signal to trace intersecting lines the intersections of which are sharply indicative of the direction of reception of said signal.

JOHN KELLY JOHNSON.
HAROLD A. WHEELER.